United States Patent [19]

Treichel et al.

[11] 4,438,818
[45] Mar. 27, 1984

[54] DRAFT CONTROL SYSTEM FOR AGRICULTURAL TRACTOR

[75] Inventors: Richard Treichel; Seaton Moon, both of Cedar Falls, Iowa

[73] Assignee: Deere & Company, Moline, Ill.

[21] Appl. No.: 390,012

[22] Filed: Jun. 21, 1982

Related U.S. Application Data

[63] Continuation-in-part of Ser. No. 209,239, Nov. 21, 1980, abandoned.

[51] Int. Cl.³ ............................................. A01B 63/112
[52] U.S. Cl. ....................................................... 172/9
[58] Field of Search ..................... 172/7, 8, 9, 10, 11, 172/12; 280/405 B, 446 R, 446 A

[56] References Cited

U.S. PATENT DOCUMENTS

| | | | |
|---|---|---|---|
| 2,887,167 | 5/1959 | Heitshu et al. | 172/9 |
| 2,921,638 | 1/1960 | Du Shane | 172/9 |
| 2,940,530 | 6/1960 | Du Shane | 172/7 |
| 3,022,830 | 2/1962 | Hess | 172/7 |
| 3,142,342 | 7/1964 | Brudnak, Jr. et al. | 172/9 |
| 3,990,520 | 11/1976 | Koch et al. | 172/7 |
| 4,057,109 | 11/1977 | Nelson | 172/7 |

FOREIGN PATENT DOCUMENTS 2379977 10/1978 France .................................. 172/7

Primary Examiner—Richard T. Stouffer
Attorney, Agent, or Firm—Henderson & Sturm

[57] ABSTRACT

A draft control system of the type in which a mechanical spring is employed to balance the draft forces of an implement trailed behind the tractor so as to correct the working depth of the implement in accordance with changes in draft forces, in which the feature is the use of a hydraulic force-amplifying device to increase the responsiveness of the system so as to minimize the forces required to effectuate regulation of the working depth of the implement.

7 Claims, 4 Drawing Figures

DRAFT CONTROL SYSTEM FOR AGRICULTURAL TRACTOR

This application is a continuation-in-part of copending United States application Ser. No. 209,239, filed Nov. 21, 1980, now abandoned.

BACKGROUND OF THE INVENTION

Draft control systems of the general type referred to above have long been known in the art, the vast majority of which depend upon some form of hydraulic power lift, or the like, controlled by a valve which is actuated first, in response to a manual setting to select a working depth and second, in response to changes in draft force or load wherein the selected depth is too deep, for example, to enable the tractor-implement outfit to proceed at a desired rate. Such changes normally occur because of increase in soil density, wheel slippage, etc. Also, the vast majority of such systems are based upon the use of a mechanical spring means against which the draft forces are balanced; such spring means already known may be coiled compression springs; bars deflectable in bending, torsion, etc.; leaf springs and the like. At least one other known system employs hydraulic means incorporated in the draft linkage. All of these systems yield essentially the same end result; namely, a signal to the valve means for the hydraulic power lift or equivalent poweradjusting means.

One problem, in any case, is caused by inherent deficiencies in the linkage means for transmitting the signal to the valve, because of such factors as lost-motion, limitations on space, etc., all of which delay response of the valve to the signal.

Assignee's U.S. Pat. No. 2,940,550 to Du Shane, may be taken as representative of a spring-responsive system employing mechanical servo linkage as the means for feeding the draft signal to the valve means. This patent shows the spring means as a bar deflectable in bending. Assignee's U.S. Patent to Du Shane U.S. Pat. No. 2,921,638 discloses the spring means as a coiled compression spring. For general purposes of the present invention, these may be taken as equivalents and as representative of mechanical spring means as distinguished from hydraulic sensing means such as that disclosed in Assignee's U.S. Pat. No. 3,990,520 to Koch. A second characteristic of Du Shane U.S. Pat. No. 2,921,638 is that the valve means may be selectively responsive to draft forces or to the vertical position of the implement (as initially selected manually) or to a combination of both. In this arrangement, in particular, the selectivity as to which response will control the valve means adds further to delaying effects on the transmission of the signal.

The Koch patent solves the problem by interposing force amplifying means in the signal transmitting means but in response to hydraulic sensing of the draft forces. The Koch patent does not consider the multi-functional characteristic of Du Shane U.S. Pat. No. 2,921,638. The force-amplifier provided by the present invention is significantly more important than in a case involving hydraulic sensing (Koch). In a mechanical sensing system, as here involved, the motion available from the load spring is often relatively small and, without amplification, frequently not sufficient to overcome reaction forces in the linkage. Unless and until the reaction forces are overcome, there will be little or no signal or at best a weak signal. Thus, the basic differences are seen to flow from the two types of sensing means, hydraulic vs. mechanical, even though the amplification function and even structure may be similar.

SUMMARY OF THE INVENTION

According to the present invention, force-amplifying means is interposed in the signal-transmitting linkage in a draft control system employing mechanical spring means. More especially, the invention provides such amplifying means in a mechanically sensing system of the character forming the subject matter of the above-mentioned Du Shane U.S. Pat. No. 2,921,638. Further features reside in incorporating the amplifying means in a known system without requiring substantial changes in the basic structure.

DETAILED DESCRIPTION OF THE PREFERRED EMBODIMENT

Figure 1:
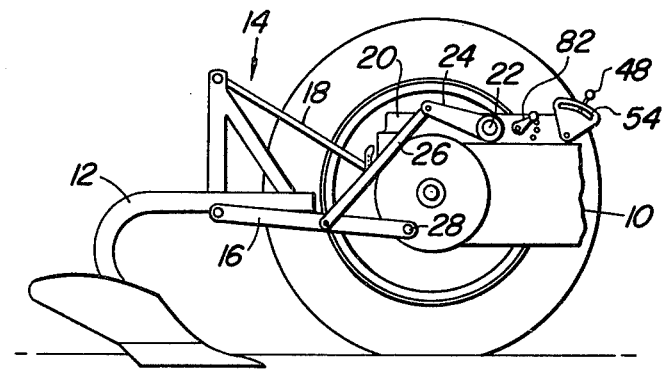
FIG. 1 is a simplified, fragmentary elevation of the rear portion of a tractor and implement connected by a hitch incorporating a draft control system.
Figure 2:
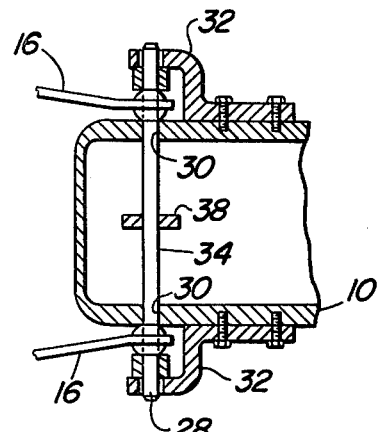
FIG. 2 is a fragmentary sectional view showing the spring means as a transverse bar deflectable in bending.

Reference will be had first to FIGS. 1 and 2 as representative of a basic type of draft control system. The numeral 10 denotes the rear portion of a tractor from which the right-hand rear wheel has been removed in the interest of clarity. An implement, such as a plow 12, is draft connected to the tractor by hitch means 14 of a typical three-point type including a pair of lower draft links 16 (see FIG. 2) and a top link 18. An upper portion of the tractor includes a housing 20 in which is journalled a transverse rockshaft 22 to opposite ends of which are affixed lift arms 24 (only one of which is shown). A lift link 26 is connected between each lift arm and its corresponding draft link, as is conventional. As will be seen, rocking of the rock shaft causes raising and lowering of the plow generally about a transverse axis established by a cross bar 28, best shown in FIG. 2.

This bar is a mechanical spring and is supported adjacent to its opposite end portions by the tractor, as at 30, and each end portion overhangs laterally to receive the front end of the respective draft link. A bracket 32 at each side of the tractor loosely embraces the respective overhanging portion so as to allow the overhanging portion to be deflected rearwardly in response to rearward draft forces imposed on the draft link by the draft on the plow, all as explained in the patent to Du Shane, U.S. Pat. No. 2,940,530. When this occurs, the midportion of the bar 28, as at 34 (see also FIG. 3) is deflected forwardly. Disposed within the tractor housing and pivoted at 36 on a transverse axis is a load responder 38. Deflection of the bar fore-and-aft at its midportion 34 causes rocking of the responder accordingly. As will be explained below, this transmits a signal that results in corrective adjustment of the working depth of the plow.

Figure 3:
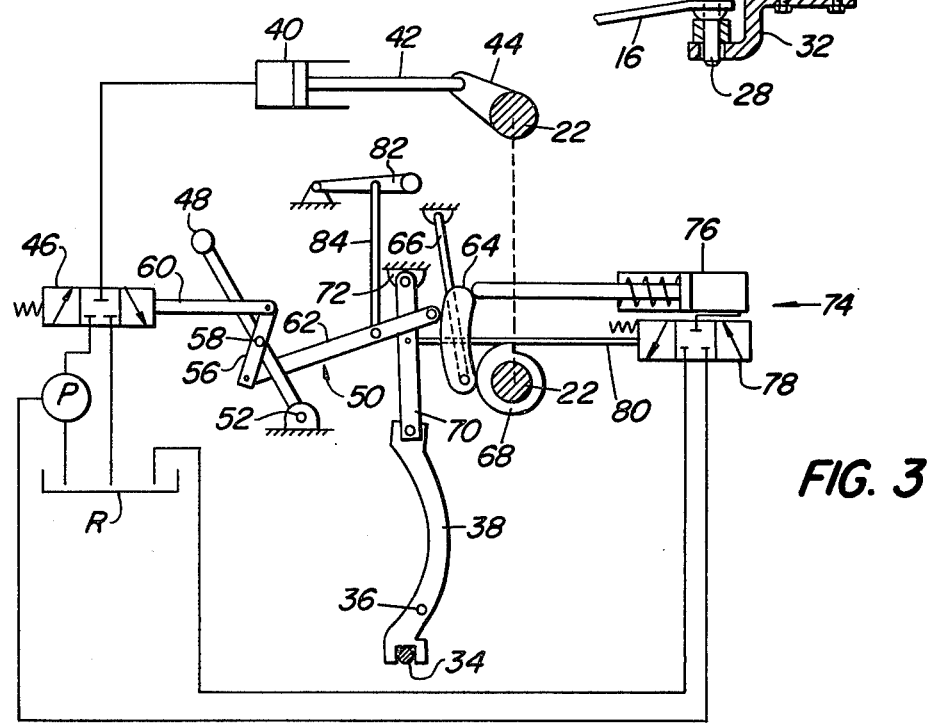
FIG. 3 is a schematic view illustrating the mechanical and hydraulic components involved in transmission of the signal from either the draft control or the manually set position of the implement.

Reference will now be had to FIG. 3. Also contained within the housing 20 for the rockshaft 22 is poweradjusting means, here a hydraulic power lift of the type including a one-way cylinder 40 and piston 42, the rod of which is connected to an internal arm 44 affixed to the rockshaft. Movement of the piston is under control of a hydraulic system including valve means 46, a pump P, a reservoir or sump R and hydraulic lines for selectively effecting the appropriate connections according to the input or signal fed to the valve 46.

A manually settable lever 48 is located conveniently on the tractor and is connected to the valve via differential or servo linkage of any suitable type, such as designated generally at 50. In this case, the valve or hand lever is pivoted at 52 on the tractor for fore-and-aft selective movement and its selected position will be retained by any conventional friction means such as indicated at 54 (FIG. 1). A short lever 56 is pivoted intermediate its ends at 58 on the hand lever 48, and one end of this short lever is pivotally connected to a link 60, in turn, connected to the valve 46, the opposite end being connected to the rear end of a link 62. The front end of the link 62 has a roller which rides the rear curved side of a cam link 64 that is floatingly supported within the tractor by a suspension link 66. The front curved side of this cam link rides a cam 68 affixed to the rockshaft 22. Without more, and considering all parts of the linkage fixed, save the hand lever 48, movement of the hand lever in a clockwise direction causes forward movement of the valve rod 60 and consequently of the valve 46 and hydraulic pressure is applied to the left end of the lift cylinder to rock the rockshaft clockwise and thus raise the plow. Conversely, if the hand lever is rocked counterclockwise, the reverse result is obtained. As the rockshaft turns, its cam 68 causes movement of the cam link 64 and this is transmitted through the link 62 which rocks the lever 56 to cause the valve 46 to return to neutral and thus to hold the new or raised position of the plow, because the cam link rides the diminishing portion of the rockshaft cam, a result that will become clearer as the description proceeds.

The upper end of the load or draft responder is pivotally connected to the lower end of a depending link 70 that is suspended within the tractor at 72. This link, and other means to be detailed immediately, forms part of the means for transmitting movement of the load responder to force amplifying means generally designated at 74. This means here comprises a biased hydraulic piston and cylinder unit 76 and valve means 78, the latter being appropriately connected to the pump and reservoir as shown. The valve means is biased to the right and is connected to the link 70 by mechanical force transmitting means such as a link 80. The piston rod of the unit 76 transmits force and movement to the cam link 64. The position of the roller equipped or front end of the link 62 along the rear edge of the cam link may be changed and held by a selector lever 82 suitably mounted on the tractor and connected by a suspension link 84 to the link 62, all as described in the above Du Shane U.S. Pat. No. 2,921,638. As shown in the present embodiment, the selected position of the link 62 is such as to make it responsive exclusively to movement of the load responder 38. When the selector 82 is moved downwardly, the link moves to the lower end of the cam link and thus makes the system exclusively responsive to the position of the implement as determined by the angular position of the rockshaft because the rockshaft cam functions as a position responder. Also, as portrayed in the last mentioned Du Shane patent, the position of the link 62 along the cam link may be selected at many points between the two extremes just discussed, thus making a combination of responses available.

The operation of the system, as exclusively responsive to movement of the load responder 38, will now be described. It will be assumed that the depth of the implement has been initially selected by the hand lever 48, which means that the valve means 46 is in neutral and the initial draft load on the plow is such that normal draft forces are exerted on the bar 28 by the draft links, in which case the bar and thus the load responder are substantially static. Now assume a change in draft force such as to cause the bar 28 to bend in such manner that its midportion 34 moves forwardly. The load responder 38 rocks counterclockwise and swings the link 70 rearwardly to pull on the valve rod 80 so as to displace the valve 78 to the left or rear, thus sending fluid under pressure to the hydraulic unit 76 such as to extend its piston to the rear. The piston then, of course, pushes the top end of the cam link 64 to the rear and this, in turn, pushes the link 62 to the rear. The hand lever 48 is set as to position and the pivot 58 now becomes a fulcrum for the lever 56, which rocks clockwise and moves the valve 46 to the right via the rod 60. This transmits fluid under pressure to the rockshaft cylinder 40 and effects clockwise rocking of the rockshaft to raise the plow to a new depth until the initially selected draft force is restored, albeit at a new working depth. When stability is resumed, the linkages move so as to restore the valve 46 to neutral to retain the new working depth. As this occurs, the top end of the load responder moves forwardly, shifting the valve 78 forwardly to exhaust the spring-biased piston in the unit 76 to the right and enabling the cam link to move, followed by forward movement of the link 62 and restoration of the valve 46 to neutral. Like results are achieved, but in a reverse manner, should the draft load decrease. Also, similar results are obtained when the responder to which the system reacts is the position responder or rockshaft cam 68. Basically, the force-amplifying means 74 increases the sensitivity of the system regardless of its selected mode and minimizes the forces required to cause a response, especially in draft control mode where forces are multiplied by the bar 28 and the several linkages. When the selector 82 is moved downwardly, it moves the link 62 to the lowermost end of the cam link 64 where it receives input solely from the position responder or rockshaft cam 68; that is to say, there is no need for force-amplification in this mode. Thus, the invention adds the force-amplification to the system without affecting its operation in depth or position control mode.

Figure 4:
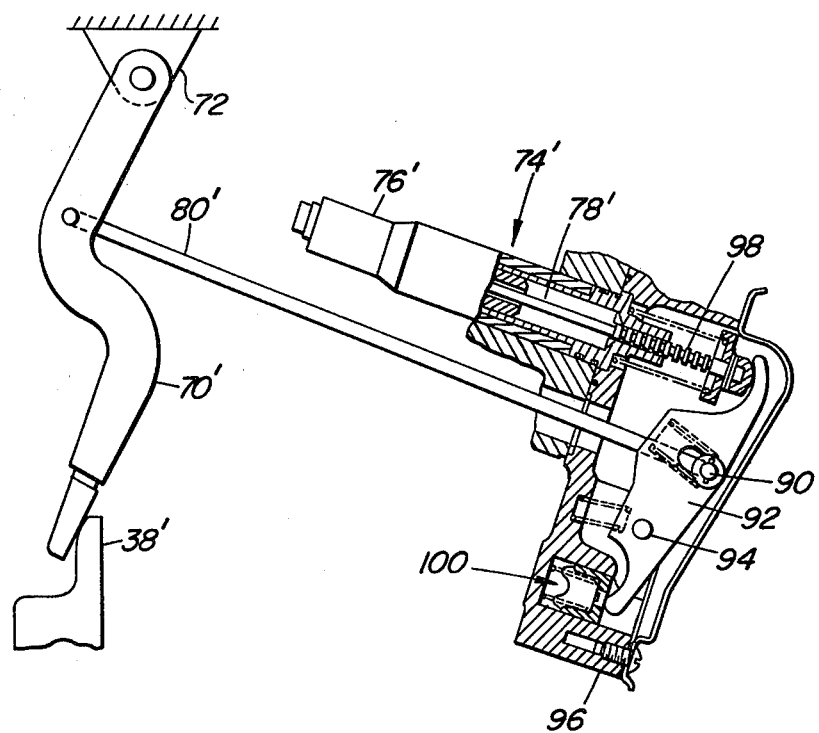
FIG. 4 is a fragmentary view, with a portion broken away, showing a modified form of valve control employing damping means.

Reference is now had to FIG. 4, wherein the following reference numerals used before are used again but with the addition of prime marks to orient the modified form of control: "38", "70", "72", "74", "76", 78' "80". In FIG. 3, the rod 80 is shown as acting directly on valve 78. In the FIG. 4 design, the rod "80" is pivotally connected at 90 to a lever 92 that is fulcrumed at 94 in a housing part 96 that is part of the housing structure that supports and encloses most of the linkage, etc., already described, but the details have been omitted in favor of showing the construction schematically. The upper end of the lever is operatively associated with a plunger 98 for the valve "78". As before, the piston of unit "76" acts on the cam 64.

The significant part of the modified structure is the use of damping means 100, here in the form of any known type of dash pot, the function of which in its action on the lever 92 below the fulcrum 94 is to control the rate at which the linkage component can move to eliminate instability which easily occurs in a system involving minimum hysteresis.

Although the amplifier is shown schematically, it is but representative of many packaged units that could be employed. One example is that shown in the aforementioned Koch patent. This simplifies the construction. Also, the amplifier is tied in with the existing hydraulic system along with most of the existing linkage, minimizing the changes required and making the improved operation available at minimum cost.

Further features will have become apparent to those versed in the art, along with the possibility of many modifications and alterations in the preferred embodiment disclosed, all of which may be realized without departure from the spirit and scope of the invention.

We claim:

1. In a tractor having fluid-power adjusting means for effecting adjustment of an associated implement to increase or decrease draft load, a draft load control system including a source of fluid pressure, main valve means operative between the power adjusting means and the source, a mechanical spring on the tractor for balancing the normal draft load of the implement, a draft responder movable on the tractor in response to changes in the spring according to changes in draft load and providing a mechanical output proportioned to draft load, a hydraulic force-amplifier on the tractor including cylinder and piston members and a second valve interposed between the cylinder member and the tractor fluid pressure source, mechanical means interposed between the draft responder and the second valve for effecting changes in position thereof in response to movement of the draft responder to cause movement of one of the force-amplifier members relative to the other, and means operative between the main valve means and the movable one of the members for operating the main valve to control the power adjusting means.

2. The invention defined in claim 1, in which the draft responder is a lever fulcrumed intermediate its ends on the tractor, one end of the lever is acted on by the mechanical spring and the other end of the lever is mechanically associated with the mechanical means that acts on the second valve.

3. The invention defined in claim 1, further characterized in that the fluid-power adjusting means includes a rockshaft having a cam thereon, a cam follower cooperates with the cam, and the means operative between the second valve and the movable member of the force-amplifier includes the cam follower, the cam follower being acted on mechanically by the movable member and the cam follower acting mechanically on the main valve.

4. The invention defined in claim 1, further characterized in that damping means is active on the mechanical means to control the rate of movement of said means and thus to stabilize the action of the second valve.

5. The invention defined in claim 4, further characterized in that the mechanical means includes a lever fulcrumed on the tractor and having one portion thereof acting on the second valve and another portion associated with the draft responder and the damping means acts on the lever.

6. The invention defined in claim 5, further characterized in that the lever is fulcrumed intermediate its ends, one end acts on the second valve and the other end is acted on by the damping means.

7. The invention defined in claim 6, further characterized in that the draft responder is connected to the lever intermediate its fulcrum and the end that acts on the second valve.

* * * * *